United States Patent
Katsumata et al.

(10) Patent No.: US 12,276,604 B2
(45) Date of Patent: Apr. 15, 2025

(54) INFRARED SPECTROMETER

(71) Applicant: JASCO CORPORATION, Tokyo (JP)

(72) Inventors: Tomohiro Katsumata, Tokyo (JP); Hiroshi Sugiyama, Tokyo (JP)

(73) Assignee: JASCO CORPORATION, Tokyo (JP)

( * ) Notice: Subject to any disclaimer, the term of this patent is extended or adjusted under 35 U.S.C. 154(b) by 281 days.

(21) Appl. No.: 18/112,150

(22) Filed: Feb. 21, 2023

(65) Prior Publication Data
US 2023/0266240 A1    Aug. 24, 2023

(30) Foreign Application Priority Data
Feb. 22, 2022 (JP) .................. 2022-025629

(51) Int. Cl.
*G01N 21/3554* (2014.01)
*B01D 53/26* (2006.01)
*G01N 21/35* (2014.01)

(52) U.S. Cl.
CPC ....... *G01N 21/3554* (2013.01); *B01D 53/261* (2013.01); *B01D 2257/80* (2013.01); *G01N 2021/3595* (2013.01)

(58) Field of Classification Search
CPC ....... G01N 21/3554; G01N 2021/3595; G01N 21/3504; G01N 2021/354; B01D 53/261; B01D 2257/80; G01J 3/453; G01J 2003/4534; G01J 3/027; G01J 3/108; G01J 3/0286
See application file for complete search history.

(56) References Cited

U.S. PATENT DOCUMENTS
2004/0056198 A1 *  3/2004  Tanaka ........... G01J 3/02
                                                250/339.08

FOREIGN PATENT DOCUMENTS
| EP | 2233898 A2 * | 9/2010 | ............. G01N 21/15 |
| JP | 61-126436 | 6/1986 | |
| JP | 2-101239 | 8/1990 | |
| JP | 10-332574 | 12/1998 | |

(Continued)

OTHER PUBLICATIONS
Extended European Search Report Issued in Corresponding EP Patent Application No. 23157627.3, dated Jul. 7, 2023.

*Primary Examiner* — Edwin C Gunberg
*Assistant Examiner* — Richard O Toohey
(74) *Attorney, Agent, or Firm* — Greenblum & Bernstein, P.L.C.

(57) ABSTRACT

An infrared spectrometer includes: an openable sealed housing that houses optical components; an infrared light source that irradiates an infrared light into the housing; a dehumidifying agent that dehumidifies an inside of the housing; a thermos-hygro sensor that detects a humidity inside the housing; and a light source control apparatus that controls power supply to the infrared light source. The light source control apparatus: starts the infrared light source while limiting power supply to the infrared light source; determines presence/absence of a risk of condensation inside the sealed housing based on detected value of humidity detected while power is supplied to the infrared light source; if the risk of condensation is present, balances a rate of increase of the detected value of humidity and a rate of decrease of humidity, and at the same time, increases power supply to the infrared light source gradually.

4 Claims, 4 Drawing Sheets

(56) References Cited

FOREIGN PATENT DOCUMENTS

| JP | 2002-71460 | | | 3/2002 |
|----|------------|---|---|--------|
| JP | 2015-55499 | | | 3/2015 |
| JP | 2015055499 | A | * | 3/2015 |
| JP | 2019-121615 | | | 7/2019 |
| JP | 2019121615 | A | * | 7/2019 |
| JP | 2021135204 | A | * | 9/2021 |

* cited by examiner

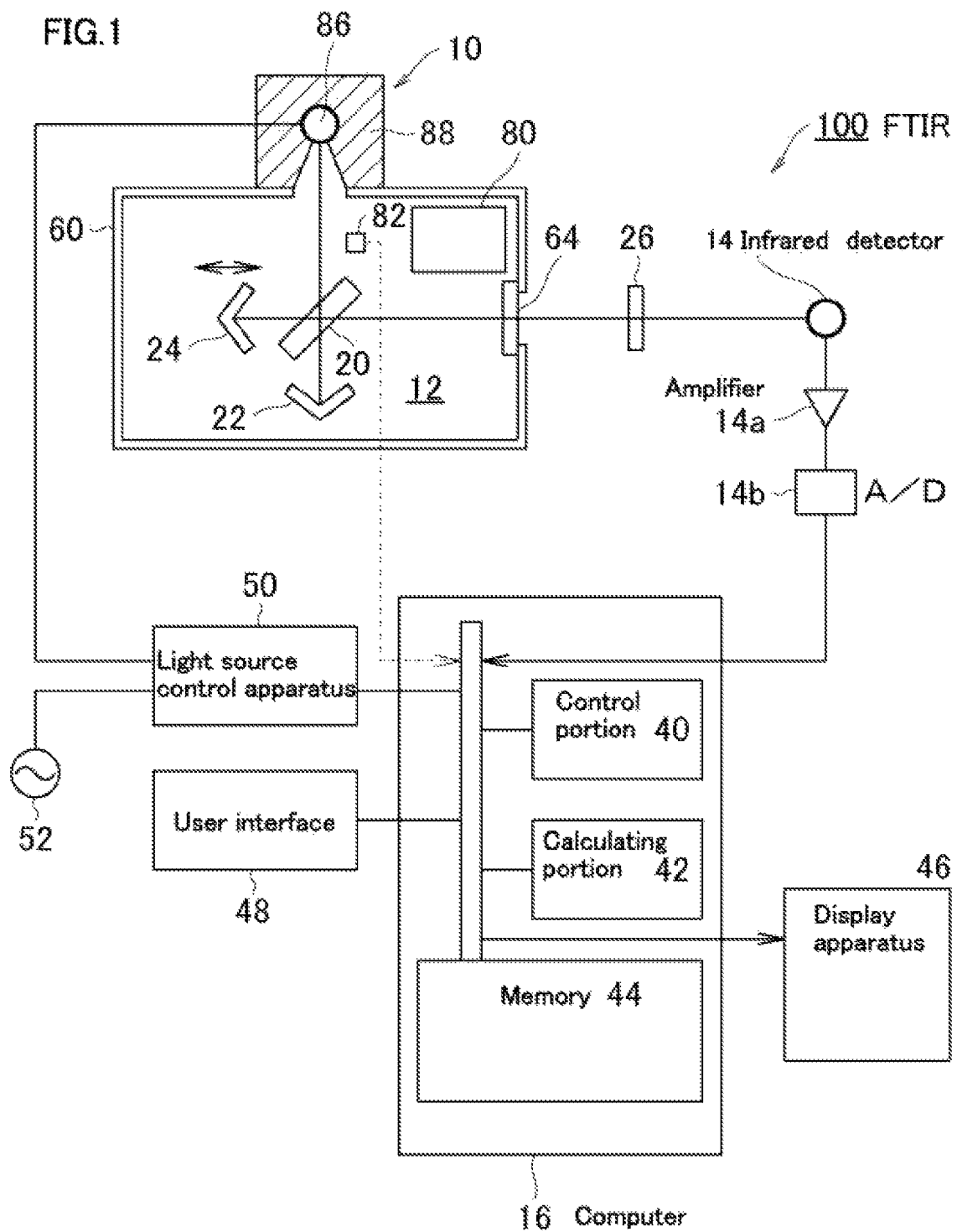

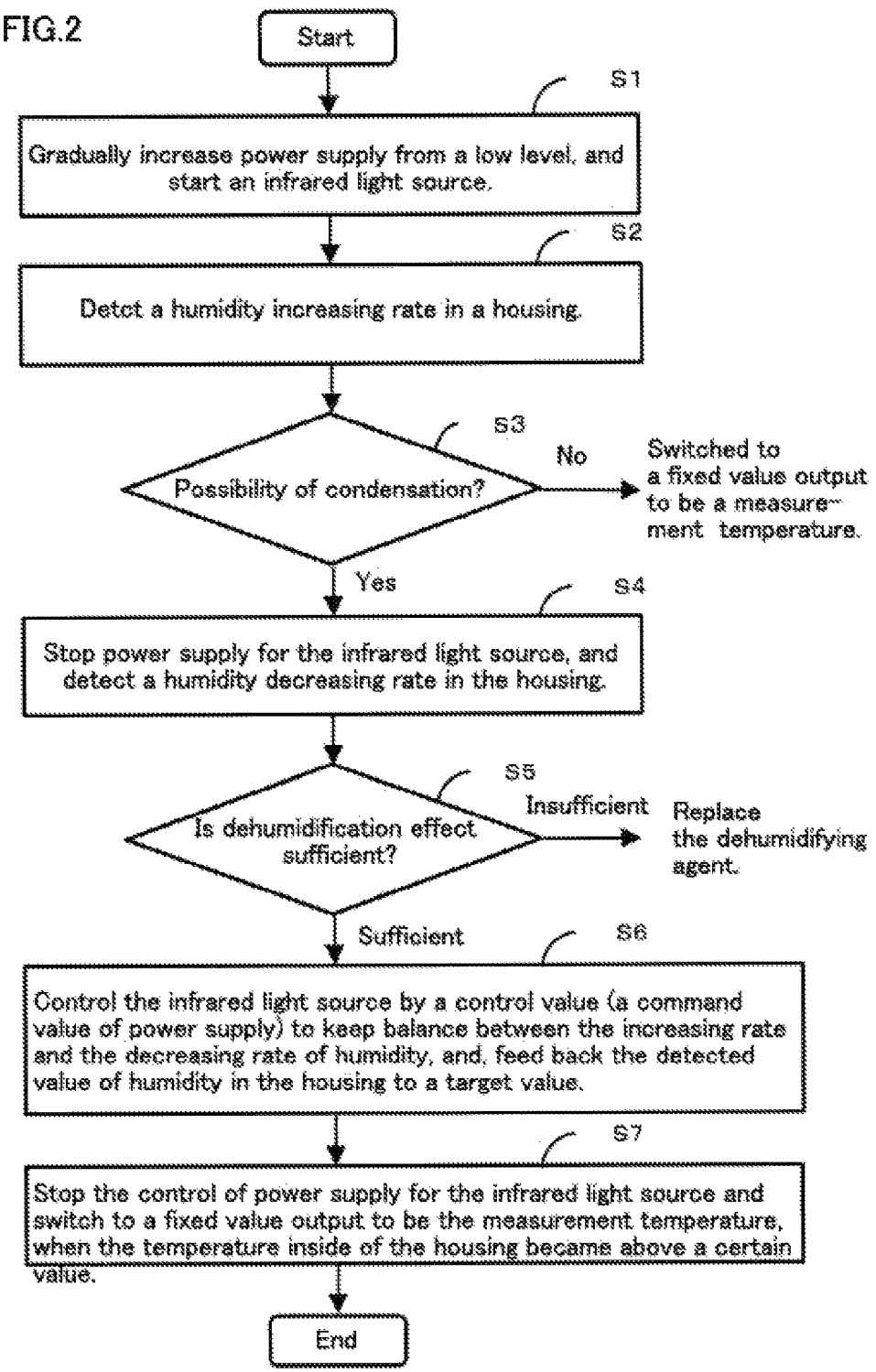

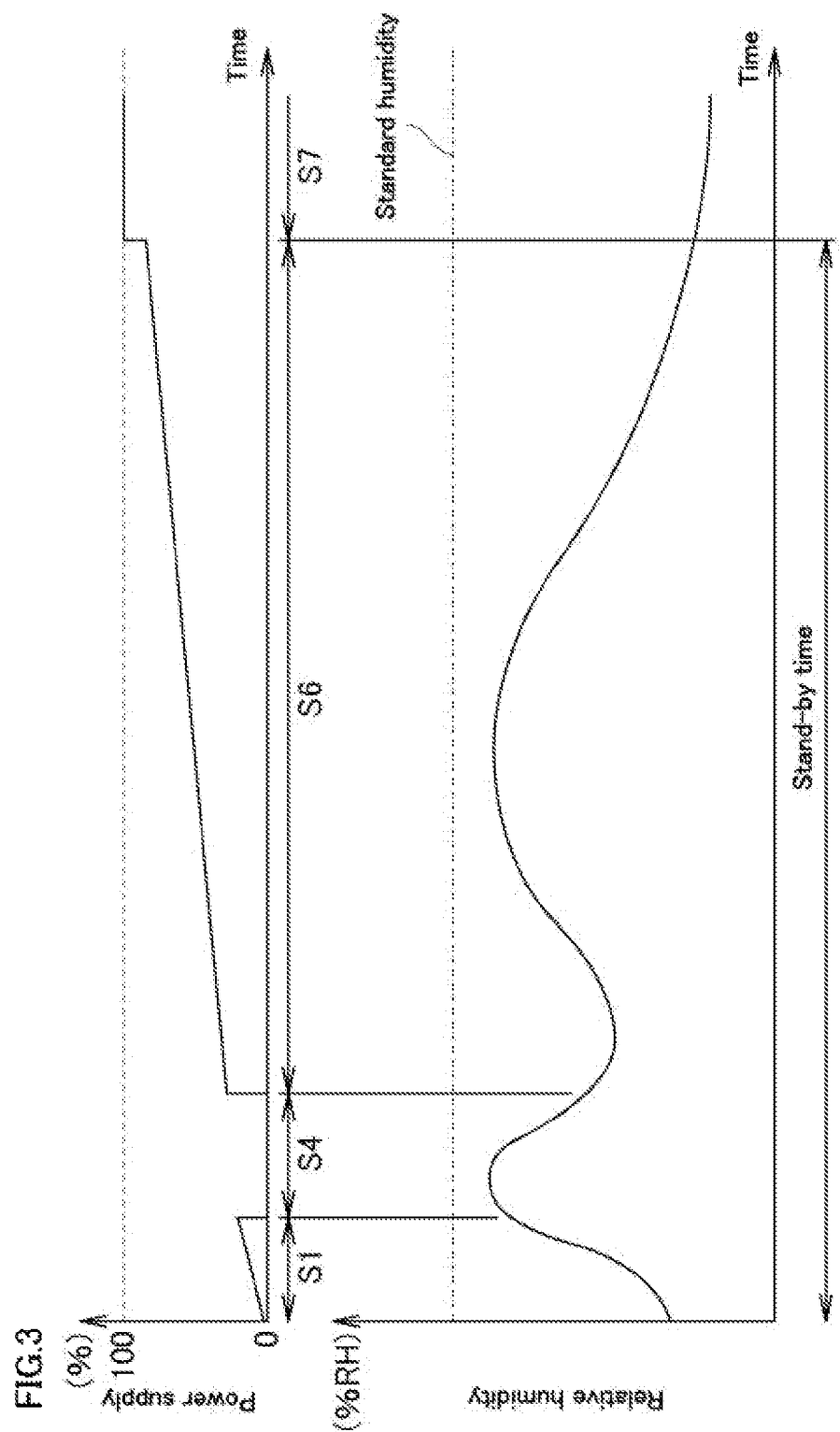

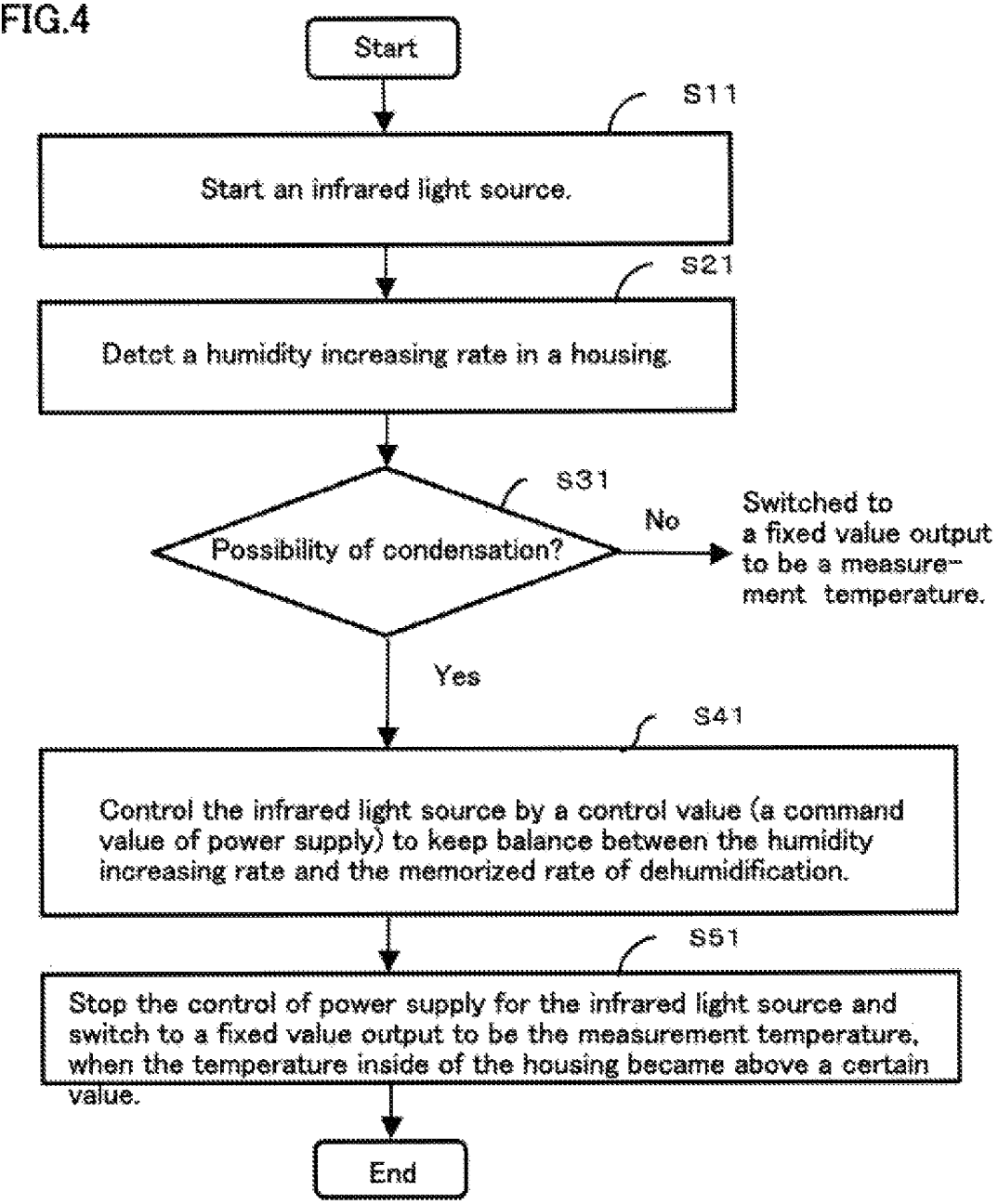

INFRARED SPECTROMETER

RELATED APPLICATION

This application claims the priority of Japanese Patent Application No. 2022-25629 filed on Nov. 5, 2021, the disclosure of which is incorporated herein by reference in its entirety.

TECHNICAL FIELD

The present invention relates to a function of starting up an infrared light source in a safe start-up mode so that condensation does not occur in an infrared spectrometer.

BACKGROUND ART

A Fourier transform infrared spectrometer (FTIR) uses an interferometer to detect an interference wave of a measurement light non-dispersively, and acquires a spectrum of the measurement light by performing Fourier transformation thereto with a computer. By forming the interference wave of the infrared light, each wavenumber component can be calculated from an intensity signal composed of total wavenumber components by Fourier transformation. Fourier transform spectroscopy is suitable for a high-speed measurement, and it is the mainstream in infrared spectrometers.

The interferometer used in this apparatus is generally a Michelson interferometer, and has a beam splitter (BS) and two reflecting mirrors (fixed mirror and movable mirror). The movable mirror makes an optical path difference of the interferometer to be changeable, and the position of the movable mirror and the optical path difference are in a one-to-one relationship. From an infrared light from an infrared light source, the interferometer generates an interference wave of the measurement light in accordance with its optical path difference. By detecting an intensity of this interference wave, an interferogram (interference curve) having the optical path difference on a horizontal axis and an intensity signal on a vertical axis can be acquired. A computer performs Fourier-transformation to an interferogram data to calculate a spectrum.

In conventional FTIR, those that are made from potassium bromide (KBr) are widely used as optical components such as a beam splitter and a window material in terms of permeability of the infrared light; however, those optical components are deliquescent and is weak against condensation. Accordingly, in order to avoid condensation by the optical components being directly exposed to water vapor in the atmosphere, a dehumidifying agent is housed together in a sealed housing (e.g., Patent Literature 1), or the sealed housing is purged with nitrogen gas (Patent Literature 2). Moreover, one comprising a protection apparatus such that a humidity sensor is provided inside the sealed housing, and the beam splitter is covered with a cover when a detected humidity becomes higher than a reference value is proposed (Patent Literature 3).

CITATION LIST

Patent Literature

Patent Literature 1: Japanese Unexamined Utility Model Publication No. H2-101239 A
Patent Literature 1: Japanese Unexamined Patent Publication No. H10-332574 A
Patent Literature 1: Japanese Unexamined Patent Publication No. S61-126436 A

SUMMARY OF INVENTION

Technical Problem

In recent years, purpose of use of a FTIR is diversified, and there is a need to carry out measurement in various measurement locations (portability).

Many conventional FTIRs are stationary types. Usually, when the power source is turned off, the main power source is not turned off, and keep a constant electric current flows to the infrared light source (constant power supply) in order to maintain the temperature. This is because, when the power source is turned on again, the temperatures of the light source and the apparatus housing stabilize earlier. However, in a case of a portable FTIR, since the power source of the apparatus is completely turned off for transportation, there is a period of which power cannot be supplied to the infrared light source. Accordingly, there is a risk of condensation inside the sealed housing, in particular on a cooled surface of the optical element (BS), when the infrared light source is switched on again because the light source and the apparatus housing are cooled during transportation.

In general, a light emitting portion of the infrared light source emits light by black-body radiation of a light emitter around a metal conductive wire by current resistance heating. The infrared light source becomes a heat source by the resistance heat thereof, and, of course, the temperature of the surrounding area increases. For example, when a part around the infrared light source, such as a heat insulator, absorbs moisture, whole water vapor is released at once upon temperature increasing. When a certain amount of this water vapor reaches around the optical element and condenses to the surface of the optical element, the surface of the optical element may be damaged (deliquesced when it is deliquescent). In particular, when the optical element is cooled, the optical element cools the warm water vapor emitted from the light source and condensation occurs easily.

Moreover, when the FTIR is placed under a very humid environment for a long-time during transportation, inflow of atmospheric air cannot be prevented completely even if it has a sealed structure, and unexpected water vapor may enter the interferometer. Water vapor may enter the interferometer due to the following special circumstances.

Release of an interferometer chamber (sealed housing) due to component replacement or maintenance.
Use or transportation under a highly humid environment over a long term.
Transportation under an environment with a hard temperature change
Operation errors.

When water vapor enters the sealed housing excessively, water vapor may be adsorbed to the heat insulator around the light source or the surface of a metal partition wall. This adsorbed water vapor may be rapidly released into the interferometer again by heat emission of the light source, and the risk of condensation increases.

Even if the infrared light source is started after confirming the humidity inside the sealed housing (or releasing the sealed housing under a low-humidity environment to release water vapor inside), the amount of adsorbed water component could not be grasped (or removed).

As described above, upon power-on from a state of which the light source and the apparatus chamber are cooled, in particular a state of which water vapor has entered the sealed housing, whole water vapor components adsorbed to the inner surface of the housing are released all at once by heat emission of the infrared light source, and the humidity inside the sealed housing increases rapidly, so that a possibility of condensation at various locations increases. In such case, dehumidification by a dehumidification agent or nitrogen gas purging apparatus was not sufficient, means protection of the optical components inside the housing was not sufficient.

It is too long to wait till starting measurements with the infrared light source on, after FTIR being warm gradually by longer time.

Not limited to the FTIR, such problems are in common with spectrometers that has a heat emitting body as a light source and is vulnerable to water vapor.

The object of the present invention is to provide an infrared spectrometer capable of executing start-up operation safely, while avoiding condensation inside a sealed housing.

Solution to Problem

The inventors diligently studied on a special circumstance of which a source of water vapor is around an infrared light source (heat source) and the water vapor behaves inside a sealed housing in a relatively short time as described above, and completed the present invention. That is, an infrared spectrometer according to the present invention comprises:
an openable sealed housing that houses optical components;
an infrared light source that irradiates an infrared light into the sealed housing;
a dehumidifying means that dehumidifies an inside of the sealed housing;
a thermo-hygro sensor that detects a humidity inside the sealed housing; and
a control means that controls power supply to the infrared light source,
takes out the infrared light as a measurement light via the optical components inside the sealed housing, irradiates the measurement light to a sample disposed outside the sealed housing, and acquires a spectrum based on a detected value of a light from the sample,
wherein the control means:
starts the infrared light source while limiting power supply to the infrared light source;
determines presence/absence of a risk of condensation inside the sealed housing based on a detected value of humidity detected while power is supplied to the infrared light source; and,
when the risk of condensation is determined to be present, balances a rate of increase of the detected value of humidity detected while power is supplied to the infrared light source and a rate of decrease of humidity dehumidified by the dehumidifying means, and at the same time, gradually increases power supply to the infrared light source.

Here, control of power supply to the infrared light source may be a duty cycle control of ON/OFF of power supply in accordance with a target value of power supply, and power may be supplied during ON, and stopped during OFF.

Here, the "humidity" indicates a relative humidity and the unit thereof is "% RH". The unit of the "temperature" is "C°". Moreover, the "dehumidifying means" includes at least one of dehumidifying agents such as a silica gel, a dehumidifier, and a gas purging apparatus of nitrogen gas.

Even if a threshold (reference humidity) of humidity is determined by calculating the dew point, for example, when the humidity increases rapidly, the amount of water vapor may exceed the threshold before feedback to the light source control. Moreover, when power supply is stopped after the rapid increase of humidity, there is a time required for heat dissipation until the temperature decreases, so that it takes a certain time to stop generation of water vapor. Whereas, in the configuration of the present invention, upon start-up of the infrared light source, the infrared light source is started while power supply to the infrared light source is limited, so that the rapid increase of humidity can be avoided.

Moreover, according to the configuration of the present invention, the infrared light source is started while power supply to the infrared light source is limited, and whether the humidity inside the sealed housing reaches the dew point (100% RH) or not may be predicted based on the humidity detected during start-up. When there is a possibility of reaching the dew point, control of the infrared light source gradually increases power supply to the infrared light source while balancing the rate of increase of the detected value of humidity detected while power is supplied to the infrared light source and the rate of decrease of humidity dehumidified by the dehumidifying means is executed. In such start-up control of the infrared light source, the rate of increase of humidity while power is supplied to the infrared light source and the rate of decrease of humidity dehumidified by the dehumidifying means are balanced, so that, even if many water vapor components to be adsorbed are present in the housing, a rapid increase of humidity inside the housing can be avoided, and a risk of condensation inside the housing does not occur.

As a result, the apparatus can be safely started while avoiding condensation even when water vapor is adsorbed inside the interferometer due to unexpected operations (such as release of the interferometer, storage without power supply over a long term, and transportation in a cold area).

Moreover, the Control Means
acquires a rate of variation of the detected value of humidity detected while power is supplied to the infrared light source as an increasing rate and a rate of variation of the detected value of humidity detected while power supply to the infrared light source is stopped as a decreasing rate,
controls power supply to the infrared light source such that the increasing rate and the decreasing rate are balanced, and controls power supply to the infrared light source such that the detected value of humidity becomes closer to a standard humidity set to be lower than 100% humidity.

Since a moisture absorbing rate by the dehumidifying means increases as the humidity is higher, water vapor can be captured quicker when the humidity inside the sealed housing is kept as high as possible within a range that condensation does not occur. Accordingly, in the configuration of the present invention, the increasing rate and the decreasing rate of humidity are balanced, and power supply to the infrared light source is controlled by the control means such that the humidity becomes close to the set standard humidity; therefore, the total time required for moisture absorption can be shortened while avoiding the rapid increase of humidity, and the temperature of the infrared light source can reach a predetermined temperature promptly.

Moreover, the control means
estimates a total amount of water vapor components adsorbed inside the sealed housing based on the rate of variation of the detected value of humidity detected while power is supplied to the infrared light source and the detected value of temperature inside the sealed housing detected by the thermo-hygro sensor, estimates a dehumidifying rate by the dehumidifying means based on the rate of variation of the detected value of humidity detected while power supply to the infrared light source is stopped, and notifies a dehumidifying time acquired from the total amount of water vapor components the dehumidifying rate as a stand-by time to a user.

According to this configuration, the total amount of water vapor components inside the sealed housing and the dehumidifying rate are acquired and the time required for dehumidification is calculated from these values by the control means, so that an approximate stand-by time can be notified to the user. Accordingly, the user can start measurement efficiently.

BRIEF DESCRIPTION OF DRAWINGS

FIG. 1 illustrates a schematic configuration of a FTIR according to one embodiment.

FIG. 2 illustrates a flow diagram of start-up of an infrared light source according to one embodiment.

FIG. 3 illustrates a schematic diagram showing a variation of humidity upon start-up of an infrared light source according to one embodiment.

FIG. 4 illustrates a flow diagram of start-up of an infrared light source according to a modification.

DESCRIPTION OF EMBODIMENTS

In the following, preferred embodiments of the present invention are described with reference to the drawings. An infrared spectrometer of the present invention can be applied to a Fourier transform infrared spectrometer (FTIR) and an infrared microscopic apparatus. Here, a case of which the infrared spectrometer is applied to a FTIR 100 as exemplified in FIG. 1 is shown in particular. The FTIR 100 comprises: an infrared light source 10; an interferometer 12 that forms an infrared interference wave; a sample holder 26 that holds a sample; an infrared detector 14 that detects an intensity of an interference wave acquired by irradiating the infrared interference wave to the sample; and a computer 16 that calculates a spectral information of the sample based on a detected signal from the infrared detector 14. The computer 16 is configured of a microcomputer installed inside the main body of the FTIR 100 or a computer provided separately therefrom.

A housing (sealed housing) 60 of the interferometer 12 is configured to be openable, and a sealed state is maintained by a sealing material between a lid material and a main body of the housing. The following optical equipment is installed inside the housing 60. That is, the infrared light source 10, a light-flux separating portion (beam splitter 20) that separates the infrared light, and a fixed mirror 22 and a movable mirror 24 those reflect the separated light respectively are disposed in the housing 60, and two light fluxes of different optical paths are synthesized to generate the infrared interference wave. The movable mirror 24 is provided to be movable in both directions of getting closer to and going away from the beam splitter 20.

The infrared interference wave that exits from an exit window 64 is irradiated to the sample inside the sample holder 26 provided between the exit window 64 and the infrared detector 14. The infrared detector 14 receives the infrared interference wave from the sample, and outputs an intensity signal thereof. A detected signal from the infrared detector 14 passes through an amplifier 14a and an A/D convertor 14b, and is input to the computer 16.

The optical components housed in the housing 60 are the beam splitter 20 and a window material 64 composed of deliquescent materials, and those are most affected by condensation. Moreover, even the optical components that are not deliquescent may be damaged by condensation of their surfaces. Since the surfaces of mirrors and lenses become cloudy by condensation, measurement may be affected.

In the housing 60 of the interferometer 12, a dehumidifying agent 80 for adsorbing and removing water vapor contained in an inner space, and a thermo-hygro sensor 82 that constantly detects the temperature and the humidity (relative humidity) inside the housing at a position close to the infrared light source 10 are housed. For example, a silica gel is used as the dehumidifying agent 80. The thermo-hygro sensor 82 may be a combination of a temperature sensor and a humidity sensor. The thermo-hygro sensor 82 usually comprises both of a thermometer (e.g., thermistor) and a hygrometer (an electric capacity varying type or an electric resistance varying type). The hygrometer detects an absolute humidity, i.e., a water vapor amount ($g/m^3$) per unit volume. The thermo-hygro sensor 82 reads out a saturated water vapor amount ($g/m^3$) at a detection temperature of the thermometer from a table, and calculates a relative humidity (% RH) from a ratio of the detected water vapor amount and the saturated water vapor amount.

The infrared light source 10 is configured of a ceramic light emitting body 86 that emits light by a resistance heat of an applied electric current that flows through a metal conductive wire, and a heat insulating material 88 provided around the light emitting body 86. The heat insulating material 88 (e.g., a ceramic fiber molded body) has a corn-shaped opening in a direction to which the light emitting body 86 emits light, for example. The infrared light source 10 is fixed to the housing 60 via the sealing material such that the corn-shaped opening matches with an opening formed on the housing 60, and irradiates the infrared light directly into the housing 60. The heat insulating material 88 is provided to suppress temperature change of the light source, prevent the surface temperature becoming high, and prevent not to heat components nearby excessively.

The heal insulating material 88 is generally porous, and easily adsorbs water vapor in the atmosphere. Moreover, water vapor adsorbed to the heat insulating material 88 is released from the heat insulating material 88 by heating all at once. In the present embodiment, the corn-shaped opening of the heat insulating material 88 is directly connected to the inner space of the housing 60, so that the heat insulating material 88 may be a source of water vapor upon start-up of the light source 10.

Not limited to the heat insulating material 88, water vapor components easily adsorb to the surface of a metal partition wall of the housing 60 and the surfaces of the metal parts of the optical components housed in the housing 60; therefore, they may be the source of water vapor in the housing 60.

The computer 16 comprises: a control portion 40 that controls each constituent of the computer 16; a calculating portion 42 that executes calculation of spectral information of the sample based on the detected signal from the infrared detector 14 and spectral analysis thereof; and a memory 44 that retains a data processing program executed by the calculating portion 42, the calculated spectral information, an analysis result, and a background information. Moreover, a display apparatus 46 and a user interface 48 are connected to the computer 16.

A light source control apparatus 50 supplies power to the infrared light source 10. For example, the light source control apparatus 50 is configured by a programmable logic device such as FPGA, and receives a command from the computer 16 to operate. The light source control apparatus 50 converts an alternating current power from an alternating current power source 52 provided outside into a predetermined direct current power, and supplies the same to the infrared light source 10. The light source control apparatus 50 can start the infrared light source 10 in two methods of a "normal mode" and a "safe start-up mode". In the safe start-up mode, power supply to the infrared light source 10 is controlled such that the detected value of humidity does not exceed the reference humidity. Moreover, the safe start-up mode of the light source control apparatus 50 may be an analogue control that supplies power of a target value to the infrared light source 10, or a duty cycle control of on/off of power supply in accordance with the target value.

<Method of Starting the Infrared Light Source>

A method of starting the infrared light source 10 is described with reference to the processing flow diagram (processing flows S1 to S7) of FIG. 2.

When the infrared light source 10 needs to be started while confirming safety of the FTIR 100, i.e., when there is a concern for precipitous generation of water vapor in accordance with start-up of the infrared light source 10, the light source control apparatus 50 gradually increases power supply to the infrared light source 10 from a lower level (processing flow S1). In this control of the infrared light source 10, a changing amount of the detected value of humidity may be controlled by PID control or in accordance therewith since change of the detected value of humidity detected by the thermo-hygro sensor 82 needs to be made as small as possible. Moreover, an adjustment parameter of the infrared light source 10 is desirably an analogue control of a value of power supply, or a duty cycle control of on/off state.

In parallel to the processing flow S1, variation over time of the humidity detected by the thermo-hygro sensor 82 is monitored, and an increasing rate of humidity inside the housing 60 is detected (processing flow S2). Then, a time correlation between the monitored variation over time of humidity and the control of the infrared light source 10 is acquired to predict whether the humidity reaches the dew point (100% RH) or not (processing flow S3). This prediction may be executed by comparing the monitored variation over time of humidity and variation over time of humidity in several memorized experimental data.

In the processing flow S3, when it is determined that there is no risk of condensation, the control of the infrared light 10 of the processing flow S1 is stopped, and it is switched to a processing of which power supply is output at a fixed value such that the temperature of the infrared light source 10 becomes the temperature upon measurement (normal mode). When the changing amount of the detected value of humidity is controlled with PID control, output of power supply may be fixed to 100%.

On the other hand, when it is determined that there is a risk of condensation in the processing flow S3, power supply to the infrared light source 10 is completely stopped once, and the decreasing rate of humidity is monitored to detect as a moisture absorbing rate of the dehumidifying agent 80 (processing flow S4).

Next, when it is determined that the detected moisture absorbing rate is low and dehumidifying effect is insufficient in the processing flow S5, all processing flows are stopped, and a message to advise replacement of the dehumidifying agent is notified to the user in some way. On the other hand, when it is determined that the detected moisture absorbing rate is greater than the predetermined rate and there is no problem in dehumidifying effect, it proceeds to the processing flow S6.

In the processing flow S6, from the relationship between the increasing rate of humidity used to determine the risk of condensation (processing flow S2) and the decreasing rate of humidity (processing flow S4), a control value (which is a released amount of water vapor per unit time, i.e., an amount of variation of a command value of power supply) of the light source of which the two rate (i.e. the increasing rate of humidity and the decreasing rate of humidity) can be balanced is derived, and the light source control is restarted at this control value. Here, if a balanced state of a releasing rate of water vapor and the moisture absorbing rate can be maintained, at least precipitous release of water vapor can be avoided.

For example, when release of water vapor proceeds and an amount of adsorption of water vapor components becomes small after this restart of the light source control, the detected value of humidity decreases in accordance therewith; therefore, the released amount of water vapor is regarded to be decreased. As a result, in order to make the control value (released amount of water vapor) back to original, the temperature of the light source is increased, i.e., a processing of increasing power supply proceeds.

Moreover, since the moisture absorbing rate of the dehumidifying agent increases as the higher humidity, water vapor is captured quicker by keeping the humidity inside the housing 60 as high as possible (to be close to a standard humidity) within a range that condensation does not occur. Accordingly, the infrared light source 10 is started by using a suitable light source control value that is predicted by balancing the increasing rate and the decreasing rate of the first time, and power supply to the infrared light source 10 is adjusted by feeding back such that the humidity becomes the target humidity (standard humidity) constantly by monitoring the variation of humidity. Accordingly, the humidity inside of the interferometer can be maintained at a humidity with a certain humidity margin (standard humidity) relative to 100% humidity (processing flow S6). If a balanced state of the releasing rate of water vapor and the moisture absorbing rate can be maintained, and the detected value of humidity can be maintained to a value close to the standard humidity as close as possible without exceeding the standard humidity (humidity of which a certain margin is subtracted from 100% humidity) which is an upper limit of capacity, the infrared light source 10 can be stabilized faster while avoiding condensation.

As a method of executing the processing flow S6 easily, for example, PID control with an enhanced differential control can be used so that the infrared light source 10 can be controlled with a certain humidity as the target value (standard humidity) while suppressing overshooting of humidity. By controlling the infrared light source 10 while feeding back the detected value to the target value, the total amount of the adsorbed water vapor of the infrared light source 10 gradually decreases; and by trying to acquire approximately the same releasing amount of water vapor as before, the temperature of the light source gradually increases.

In the processing flows up to here, if the value is experimentally acquired in advance, the total amount of the adsorbed water component can be predicted with a simple accuracy from the value of the increasing rate of humidity at the first time (processing flow S2) and the detected value of humidity. Moreover, by using the detected value of the decreasing rate of humidity inside the housing (processing flow S4), a time for the absorbed water components to be adsorbed by the dehumidifying agent (stand-by time for the apparatus to become ready for use) can be notified to the user as a predicted value. Furthermore, the latest stand-by time can be re-notified to the user by remeasuring at least either of the increasing rate and the decreasing rate of humidity, and recalculating the stand-by time until the apparatus is ready for use.

Finally, when it can be determined that a possibility for the absorbed water vapor to be released all at once, which had been the risk of condensation, has disappeared based on some determination value such as the temperature of the infrared light source 10 becoming above a certain level, the control of the infrared light source 10 is stopped, and it is switched to a fixed value output such that it becomes the temperature at the time of measurement. Moreover, the user is notified in some way that the apparatus is ready to use (processing flow S7).

FIG. 3 schematically shows an example of humidity variation upon start-up of the infrared light source 10 according to the present embodiment.

In the FTIR 100 of the present embodiment, the dehumidifying agent 80 is used as the dehumidifying means; however, instead of or together with the dehumidifying agent 80, a dehumidifier or a nitrogen gas purging apparatus may be provided, so that an effect of the present embodiment can be achieved similarly. For example, to a determination that dehumidifying effect is insufficient (processing flow S5), all processing flows may be stopped (movable-mirror control is stopped too), and a message to advise replacement of the dehumidifying agent or an operation to enhance dehumidifying effect (operation to increase flow rate of the dehumidifier or gas purging) may be notified to the user.

Moreover, in the present embodiment, the thermo-hygro sensor 82 is used to monitor the temperature and humidity inside the housing 60. However, in terms of measures for condensation, it is to avoid precipitation and condensation of water component which is saturated from cooled air by hitting on the surface of the substantially cooled optical element; therefore, whether the optical element is cold relative to air or not is a big factor. Accordingly, by adding a sensor that measures the temperature around the optical elements of which condensation needs to be avoided, a necessary margin humidity can be acquired more accurately.

FIG. 4 illustrates a flow diagram of start-up of the infrared light source according to a modification. The processing is the simplified processing flow of FIG. 2 according to the present embodiment. For example, upon start-up of the infrared light source 10 at the processing flow S11, it is not necessary to increase power supply from a lower level as in the processing flow S1, and the infrared light source 10 may be started by supplying a constant power as in the normal flow. Moreover, the increasing rate of humidity may not be necessarily detected as in the processing flow S21. It is sufficient if an extent of an increase of humidity can be detected, and the risk of condensation may be determined by comparing with a previous data stored in the memory 44. Moreover, as in the processing flow S41, a control value such that the extent of the increase of humidity and an extent of dehumidification stored in the memory 44 in advance are balanced may be calculated to control the infrared light source 10.

The housing 60 of the FTIR 100 of the present embodiment has a sealed structure, and water vapor hardly enters from outside as long as it is used normally. The time required for start-up in the method of starting the light source of the present embodiment is longer compared to a method of simply starting the infrared light source 10 with a constant power (referred to as "normal mode"). Accordingly, this method of starting the light source should be applied to start-up of the infrared light source 10 only when necessary. The computer 16 may be provided with a mode switching function such that the computer 16 can determine that a special circumstance, such as entry of water vapor, has occurred, and execute the method of starting the light source of the present embodiment with the "safe start-up mode" only when such circumstance has occurred.

A case of which a special circumstance, entry of water vapor, as described above has occurred is exemplified.

(1) First Start-Up when Power is Completely Stopped

To maintain the humidity inside the housing 60 to a low state and to stabilize the light source upon start-up at high rate, it is often the case that the FTIR 100 is continuously supplied with power even when it is not in use, and the infrared light source 10 is heated at low temperature (constant power supplied state). Accordingly, a complete shutdown of power often occurs in special cases such as transportation, long-term storage, and blackout. Therefore, when the computer 16 recognizes that the light source has returned from those complete shutdown states, start-up with the "safe start-up mode" is automatically selected.

(2) When there is an Access into the Housing 60

In the FTIR 100, there is a case of when the user replaces the optical elements such as the beam splitter 20 to vary a measurement wavenumber band. When the infrared light source 10 is started and the temperature thereof is high, even if an external air that contains some humidity flows therein, adsorption does not occur and a risk of condensation is not high. However, when there is an unexpected operation, such as opening the housing 60 to replace the optical elements in the constant power supplied state, a risk of adsorption of water vapor that entered therein occurs. Accordingly, the optical elements just before the constant power supplied state are recognized by a dedicated sensor, and the optical elements are recognized with the sensor again when the light source is started from the constant power supplied state; therefore, when it is determined that the optical element is replaced with another one, the computer 16 automatically selects start-up with the "safe start-up mode".

(3) When Maintenance is Carried Out

When an engineer carries out maintenance of the FTIR 100, the sealed housing 60 is released sometimes. Accordingly, upon restart-up after this maintenance, start-up with the "safe start-up mode" is automatically selected. For example, a user interface 48 of a hardware or a software such that the user himself/herself can designate the start-up mode may be configured to the FTIR 100.

When the infrared light source 10 is started with the normal mode, not the safe start-up mode, the presence/absence of a risk unexpected by the light source control apparatus 50 may be determined by using a simple reference (whether a first extent of start-up of the humidity is greater than a reference extent) contained in the contents shown in the present embodiment. For example, when the infrared light source 10 is started with a constant power without controlling power supply, the humidity is monitored, and if it is determined that there is a risk of condensation, start-up with a constant power is stopped at this point. Then, processing of notifying the risk of condensation to the user, and re-starting by the safe start-up mode automatically may be proceeded.

Moreover, when the humidity inside the housing 60 increases suddenly due to an operation error of the user, the computer 16 may execute the processing such as warning to the user.

REFERENCE SIGNS LIST

10 Infrared light source
12 Interferometer
14 Infrared detector
20 Beam splitter (light-flux separating portion)
22 Fixed mirror
24 Movable mirror
50 Light source control apparatus (control mean)
60 Sealed housing
82 Thermo-hygro sensor
86 Light emitting body
88 Heat insulating material
100 Fourier transform infrared spectrometer (FTIR)

The invention claimed is:

1. An infrared spectrometer comprising
an openable sealed housing that houses optical components;
an infrared light source that irradiates an infrared light into the sealed housing;
a dehumidifier that dehumidifies an inside of the sealed housing;
a thermo-hygro sensor that detects a humidity inside the sealed housing; and
a controller that controls power supply to the infrared light source,
takes out the infrared light as a measurement light via the optical components inside the sealed housing, irradiates the measurement light to a sample disposed outside the sealed housing, and acquires a spectrum based on a detected value of a light from the sample,
wherein the controller:
starts the infrared light source while limiting power supply to the infrared light source;
determines presence/absence of a risk of condensation inside the sealed housing based on a detected value of humidity detected while power is supplied to the infrared light source; and,
when the risk of condensation is determined to be present, balances a rate of increase of the detected value of humidity detected while power is supplied to the infrared light source and a rate of decrease of humidity dehumidified by the dehumidifier, and at the same time, gradually increases power supply to the infrared light source.

2. The infrared spectrometer of claim 1, wherein the controller:
acquires a rate of variation of the detected value of humidity detected while power is supplied to the infrared light source as an increasing rate and a rate of variation of the detected value of humidity detected while power supply to the infrared light source is stopped as a decreasing rate, and
controls power supply to the infrared light source such that the increasing rate and the decreasing rate are balanced, and controls power supply to the infrared light source such that the detected value of humidity becomes closer to a standard humidity set to be lower than 100% humidity.

3. The infrared spectrometer of claim 1, wherein the controller:
estimates a total amount of water vapor components adsorbed inside the sealed housing based on the rate of variation of the detected value of humidity detected while power is supplied to the infrared light source and the detected value of temperature inside the sealed housing detected by the thermo-hygro sensor,
estimates a dehumidifying rate by the dehumidifier based on the rate of variation of the detected value of humidity detected while power supply to the infrared light source is stopped, and
notifies a dehumidifying time acquired from the total amount of water vapor components and the dehumidifying rate as a stand-by time to a user.

4. The infrared spectrometer of claim 2, wherein the controller:
estimates a total amount of water vapor components adsorbed inside the sealed housing based on the rate of variation of the detected value of humidity detected while power is supplied to the infrared light source and the detected value of temperature inside the sealed housing detected by the thermo-hygro sensor,
estimates a dehumidifying rate by the dehumidifier based on the rate of variation of the detected value of humidity detected while power supply to the infrared light source is stopped, and
notifies a dehumidifying time acquired from the total amount of water vapor components and the dehumidifying rate as a stand-by time to a user.

\* \* \* \* \*